US012399255B2

(12) United States Patent
Emadi et al.

(10) Patent No.: US 12,399,255 B2
(45) Date of Patent: Aug. 26, 2025

(54) SEMI-SPARSE MULTIPLE-INPUT AND MULTIPLE-OUTPUT (MIMO) ARRAY AND SEQUENTIAL BEAMFORMING TECHNIQUES

(71) Applicant: Zadar Labs, Inc., Santa Clara, CA (US)

(72) Inventors: Mohammad Emadi, Santa Clara, CA (US); Ali Mostajeran, Santa Clara, CA (US); Mahmoud Saadat, Santa Clara, CA (US)

(73) Assignee: Zadar Labs, Inc., Campbell, CA (US)

( * ) Notice: Subject to any disclaimer, the term of this patent is extended or adjusted under 35 U.S.C. 154(b) by 340 days.

(21) Appl. No.: 18/071,525

(22) Filed: Nov. 29, 2022

(65) Prior Publication Data

US 2023/0176189 A1  Jun. 8, 2023

Related U.S. Application Data

(60) Provisional application No. 63/285,354, filed on Dec. 2, 2021.

(51) Int. Cl.
*G01S 7/42* (2006.01)
*G01S 7/41* (2006.01)

(52) U.S. Cl.
CPC ............... *G01S 7/42* (2013.01); *G01S 7/411* (2013.01)

(58) Field of Classification Search
CPC . G01S 7/42; G01S 7/411; G01S 13/42; G01S 13/584; G01S 7/2813
See application file for complete search history.

(56) References Cited

U.S. PATENT DOCUMENTS 9,470,782 B2  10/2016  Millar et al.
10,921,436 B2  2/2021  Jansen
(Continued)

FOREIGN PATENT DOCUMENTS

EP   3015880 B1   2/2020

OTHER PUBLICATIONS

T. Kishigami, K. Iwasa, H. Yomo, A. Matsuoka and J. Sato, "2D Maximum Likelihood Angle Estimation for MIMO Radar with Unequally Spaced L-shaped Arrays," 2018 15th European Radar Conference (EuRAD), Madrid, Spain, 2018, pp. 130-133) (Year: 2018).*

(Continued)

*Primary Examiner* — Vladimir Magloire
*Assistant Examiner* — Bongani Jabulani Mashele
(74) *Attorney, Agent, or Firm* — UTULAW PC

(57) ABSTRACT

A multiple-input and multiple-output (MIMO) radar system, including a horizontal antenna array having horizontal elements to detect an azimuth angle estimation, the horizontal elements being arranged in a sparse and non-sparse distribution, a vertical antenna array having vertical elements to detect an elevation angle estimation, the vertical elements being arranged in a sparse and non-sparse distribution, and a two-dimensional antenna array including a portion of the horizontal antenna array and a portion of the vertical antenna array. The system is configured to estimate, using the horizontal antenna array, an azimuth angle, to estimate, using the vertical antenna array, an elevation angle, to identify, based on the azimuth angle and the elevation angle, one or more ambiguities, and to analyze, using a portion of the two-dimensional antenna array, the one or more ambiguities to determine a more accurate azimuth angle and elevation angle.

11 Claims, 5 Drawing Sheets

(56) References Cited

U.S. PATENT DOCUMENTS

| | | |
|---|---|---|
| 11,131,749 B2* | 9/2021 | Loesch .................. G01S 13/931 |
| 2013/0016003 A1 | 1/2013 | Stirling-Gallacher et al. |
| 2016/0131752 A1 | 5/2016 | Jansen et al. |
| 2017/0131394 A1 | 5/2017 | Roger et al. |
| 2018/0348343 A1 | 12/2018 | Achour et al. |
| 2020/0292663 A1 | 9/2020 | Bai et al. |

OTHER PUBLICATIONS

Tayem and H. M. Kwon, "L-shape 2-dimensional arrival angle estimation with propagator method," in IEEE Transactions on Antennas and Propagation, vol. 53, No. 5, pp. 1622-1630, May 2005 (Year: 2005).*

A. Di Serio, P. Hügler, F. Roos and C. Waldschmidt, "2-D MIMO Radar: A Method for Array Performance Assessment and Design of a Planar Antenna Array," in IEEE Transactions on Antennas and Propagation, vol. 68, No. 6, pp. 4604-4616, Jun. 2020 (Year: 2020).*

Non-Final Office Action issued Feb. 13, 2025 in U.S. Appl. No. 18/071,495.

Non-Final Office Action issued Feb. 14, 2025 in U.S. Appl. No. 18/071,512.

* cited by examiner

SEMI-SPARSE MULTIPLE-INPUT AND MULTIPLE-OUTPUT (MIMO) ARRAY AND SEQUENTIAL BEAMFORMING TECHNIQUES

BACKGROUND

Antenna array technology is used to improve system performance in application fields such as wireless sensor network systems, super-high frequency imaging systems, intelligent traffic systems (ITSs), radar control systems, and so on. This antenna array technology has recently been regarded as critical technology for high-tech high-performance systems and will likely acquire more important uses in the future.

Conventionally, an FMCW (Frequency Modulated Continuous Wave) radar has been used as a means for knowing the distance to a target and the velocity of the target. In a conventional FMCW radar, a receiving signal is frequency-converted with the same FMCW signal as a transmitting signal, whereby a baseband signal is generated.

Typical radar apparatuses using such an antenna array make use of a phase array, which transmits a signal to all transmission antennas. A multiple-input multiple-output (MIMO) radar system has recently been proposed to improve target detection performance with better angular resolution. This MIMO radar system transmits signals to respective antennas, so that it is possible to improve detection performance and obtain a high-resolution image.

However, the resolution of the aforementioned systems often requires a large number of transmitters (TX) and receivers (RX). Although MIMO radars are extremely useful, the requirements for proper usage may be high. Accordingly, presented herein are improved systems and methods associated with using a semi-sparse array of MIMO radars and sequential beamforming techniques reducing sidelobes as well as grating lobes in azimuth and elevation beamforming techniques.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

SUMMARY

Disclosed herein are systems and methods related to sequential beamforming techniques for semi-sparse multiple-input and multiple-output (MIMO) arrays. The system includes a horizontal antenna array and a vertical antenna array, which combine to create a 2D antenna array. The horizontal antenna array has horizontal elements arranged in a sparse and non-sparse distribution and is configured to detect an azimuth angle estimation with no grating lobe issue. The vertical antenna array has vertical elements arranged in a sparse and non-sparse distribution and is configured to detect an elevation angle estimation. The system can estimate an azimuth angle and an elevation angle with ambiguities. Using all/a portion of the 2D antenna array, the system then analyzes the ambiguities to determine the accurate azimuth angle and elevation angle of each target.

There is a high demand to improve the angular resolution of radars. However, the required better angular resolution results in large aperture size of the antenna arrays. This large area needs to be filled with several antenna elements. Using more and more antenna elements will result in the huge computational burden, more power consumption, more complicated design. Using sparse array can reduce the complexity; however, it will result in large sidelobes and grating lobes in the final antenna pattern.

The present application describes a novel method to do 3D beamforming in azimuth and elevation separately and then combining the results and assigning different angles to the predefined detected objects. Moreover, the instant application describes new techniques for reducing sidelobes as well as grating lobes in azimuth and elevation beamforming techniques. Specifically, the instant application describes:
  a. a novel sparse sensor array configuration which is suitable for automotive radar applications.
  b. a new novel technique for 3D beamforming in a sequential way by estimating azimuth angle first, then elevation and eventually using all elements for solving ambiguities.
  c. a new novel method for estimating the angle in a sparse MIMO array which is not sensitive to grating lobes and sidelobes.

Figure 1:
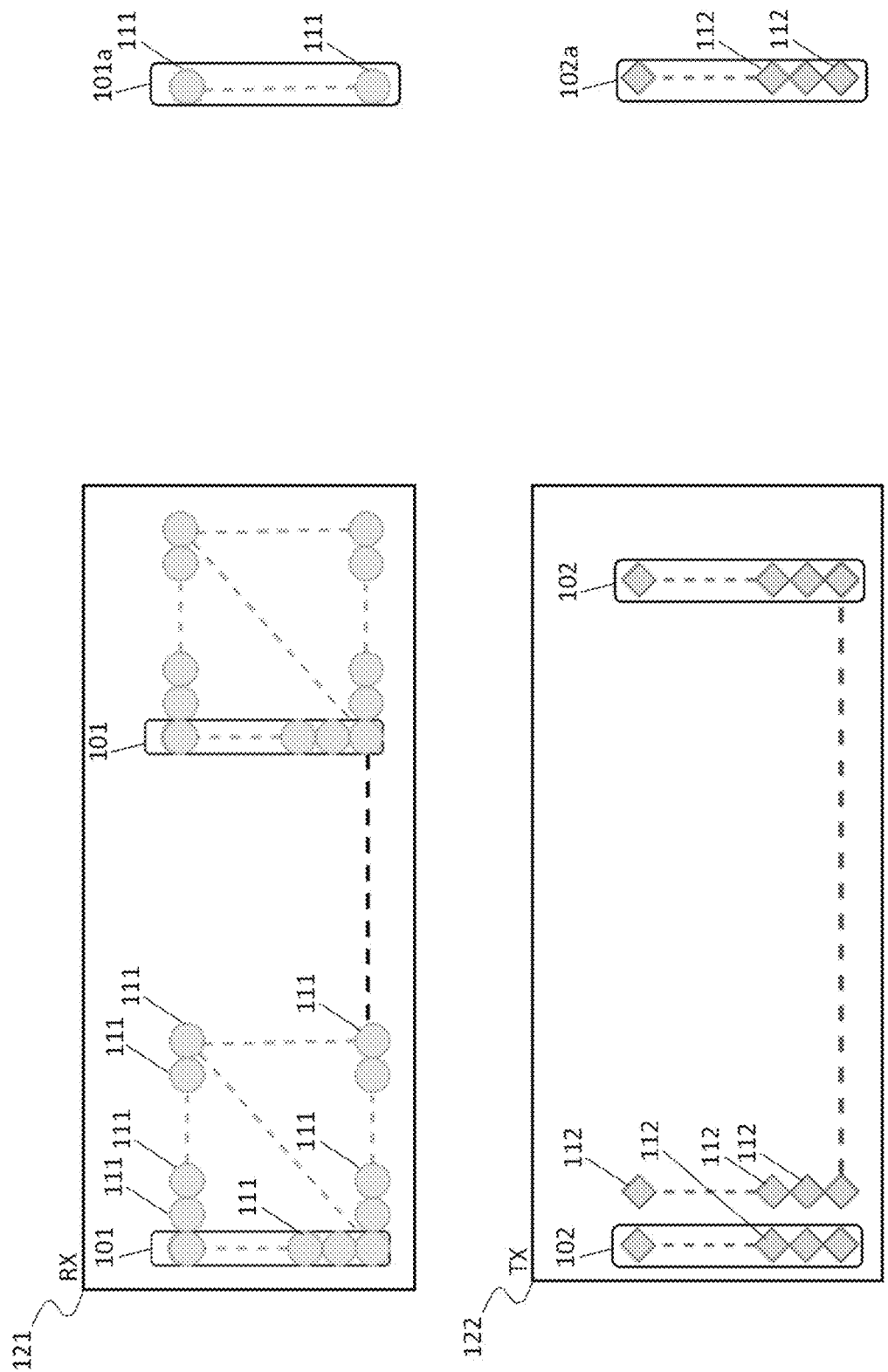
FIG. 1 is a conceptual diagram of a hybrid analog-digital sparse-MIMO array configuration for Azimuth angle estimation.

In one specific implementation, the instant application describes a semi-random placement of the array in a sparse way. FIG. 1 shows the array manifold for estimating azimuth. This figure composed of several parts, 101 shows the basic elements of the array (called a molecule in this application). Each molecule is composed of several atoms. An atom is a single antenna element that could be a patch, dipole, slot or any other type of antenna. Several atoms grouped together will form a molecule. These atoms can have analog beamforming or some fixed shaping based on the microstip line that may be placed inside the array.

Figure 2:
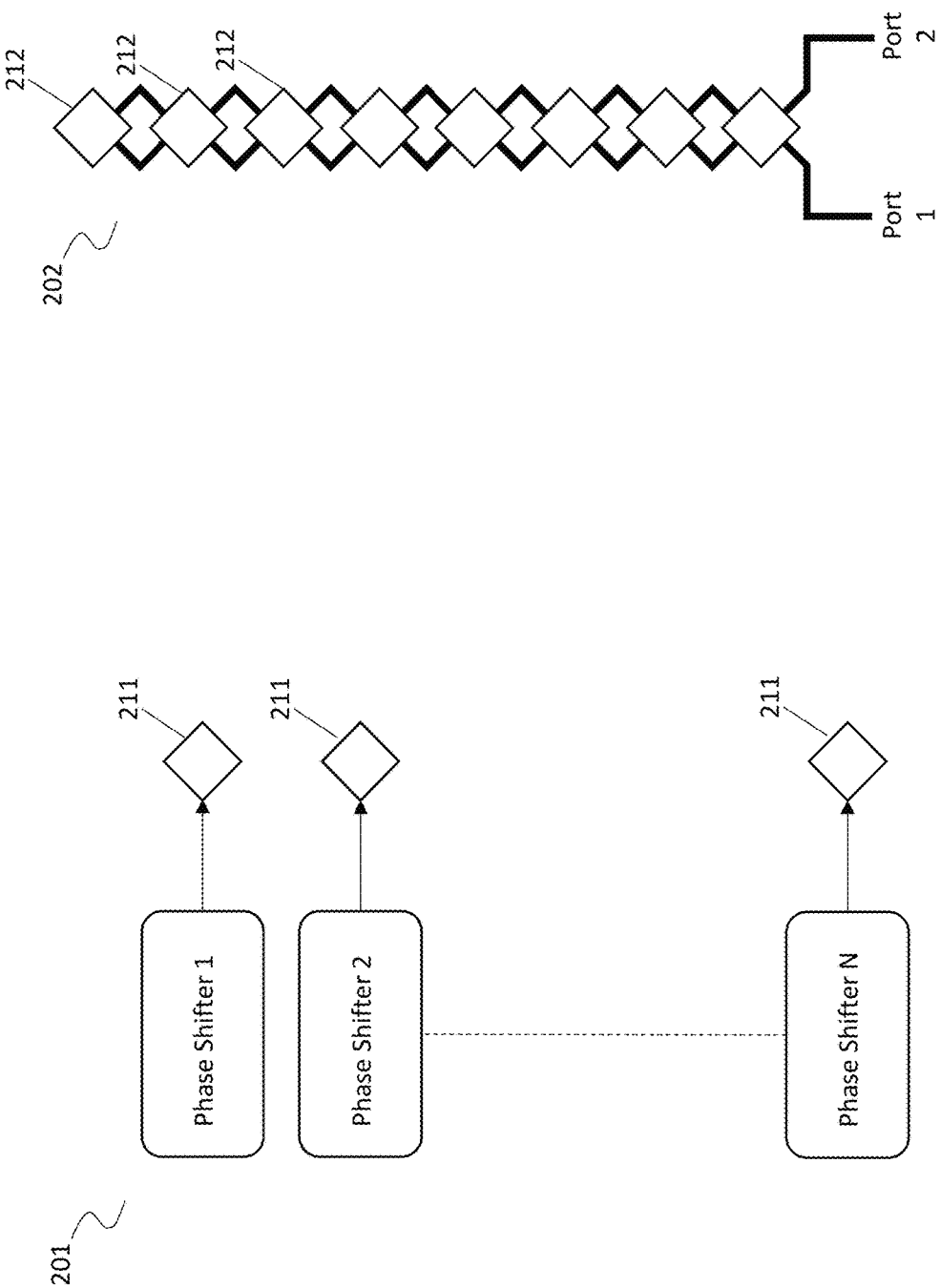
FIG. 2 is a conceptual illustration of possible molecule configurations.

FIG. 2. shows the two different types of molecules one can use. The number of atoms in each molecule can be different on the receiver and transmitter side. We assume N_Analog_Beam_Elevation_Rx and N_Analog_Beam_Elevation_Tx antenna elements on each molecule. Several molecules together can result in a cell which is shown at 121. This application discloses the idea to put many antenna elements on one edge of the available area and a minimal number on the other edge. For example, one can put 10 molecules on the left side and only one molecule on the right side of the available area for azimuth digital beamforming. The transmitter molecules can be placed uniformly to fill the area .350 in FIG. 3 or (122 section in FIG. 1) without grating lobes. The last transmit antenna (102) is placed at the edge of the available area to extend the aperture size of the array in the azimuth direction as much as possible.

Figure 3:
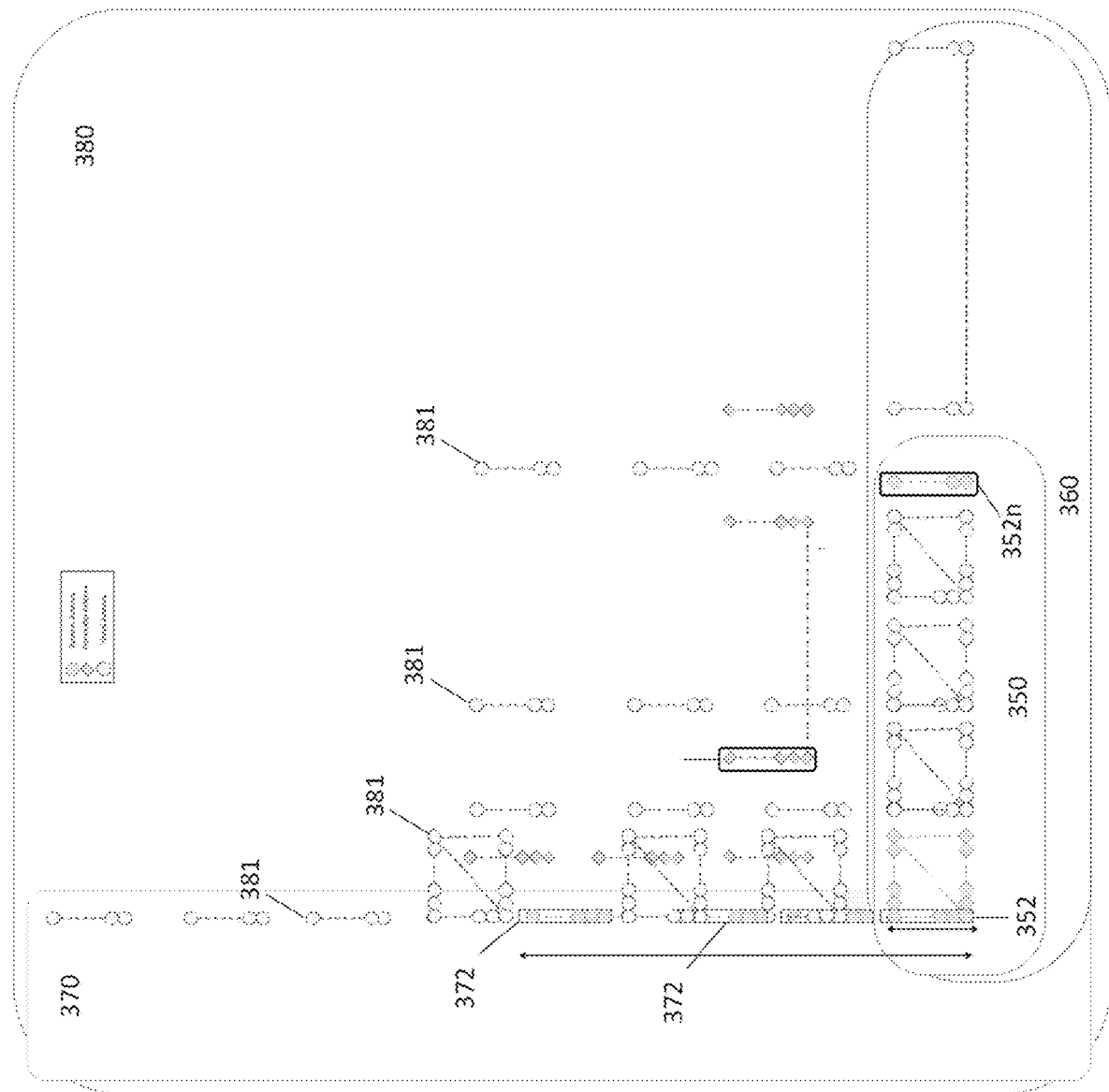
FIG. 3 is a conceptual diagram of a total array configuration.

All the receivers with MIMO techniques on the transmitter side will result in Area 360, which enable performing perfect azimuth beamforming. Area 360 is called a Tissue. In fact, many cells work together inside a tissue to perform azimuth beamforming. A different approach in the elevation domain is disclosed herein. The main reason for this is the FOV and coverage angle in elevation is completely different compared to azimuth. For example, most radars have an elevation FOV of +/−10 degrees compared to an azimuth FOV of +/−60 degrees. The molecules may be placed in the elevation direction in a more sparse, but uniform pattern. Each molecule could employ analog beamforming. For MIMO on the transmitter side, one transmitter at each edge to maximize resolution may be needed. Other transmitter antennas may be needed to reduce sidelobes (FIG. 3). This area 370 is called another Tissue.

Two tissues together (Area 350 and Area 360) with the help of MIMO transmitters will cover some area between them to solve any coupling between azimuth and elevation angles. This Area (area 380) is called an Organ in this application.

A typical number of physical antenna elements could be 128 receivers and 96 transmitters:
  a. N_Analog_Beam_Elevation_Rx=8
  b. N_Analog_Beam_Elevation_Tx=8
  c. N_Azimuth_RX_1=10
  d. N_Azimuth_RX_2=2
  e. N_Elevation_RX=4
  f. N_Azimuth_TX=8
  g. N_Elevation_TX=4

Using MIMO, the typical virtual array size will be 16×12×8=1536 elements

In one implementation, a hybrid beamforming may be used, in which analog beamforming is used inside the molecule and digital beamforming between molecules. To perform beamforming, a sequential beamforming technique may be used by which azimuth beamforming is first performed and then elevation beamforming is performed, and finally ambiguity between detected elevation angles is removed.

Figure 5:
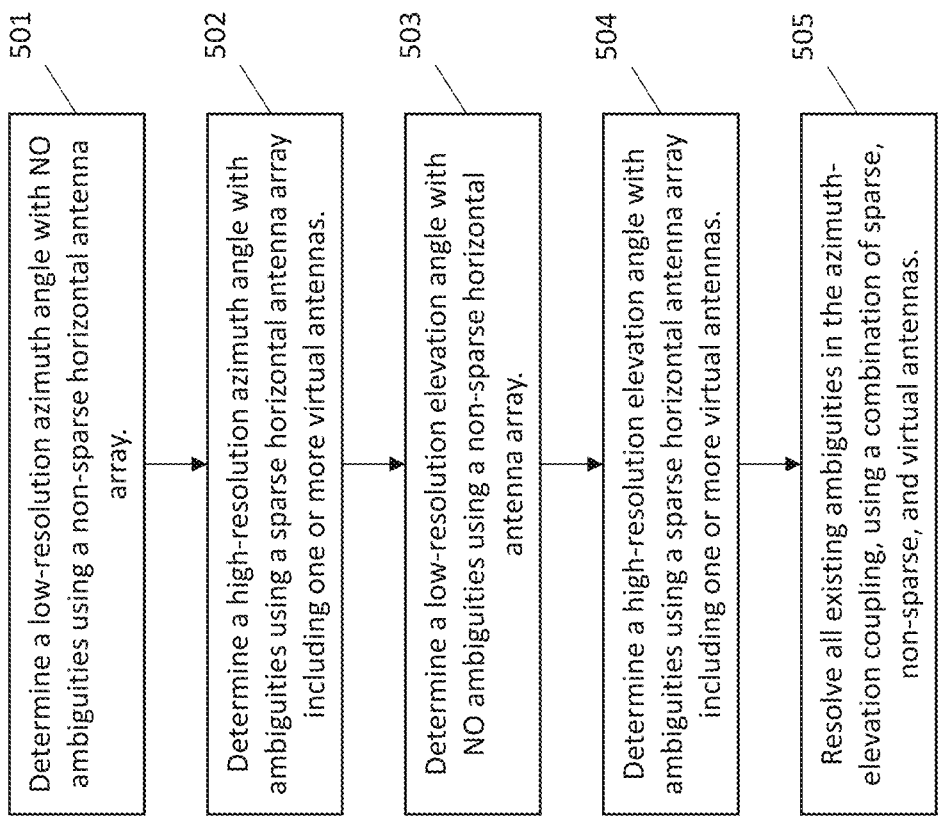
FIG. 5 is another conceptual technique for angular estimation based on an embodiment.

FIG. 5 shows detailed proposed techniques step by step. First, the doppler of the target is estimated to perform the doppler compensation for before doing the beamforming. To do so, all or some of the virtual antenna elements after range-doppler processing may be used and non-coherent integration over space to detect and estimate the doppler of the target (401). Instead of this technique, if there are some overlap between antenna elements we can use that and perform coherent beamforming between antenna elements. After that azimuth beamforming is performed on all antenna elements on section 350 to find the estimated angle of the arrival only in azimuth without grating lobes (402 and 403). To reduce sidelobes here one can use windowing as well. The next step is to increase the resolution and accuracy for detected angles. In this case, all the virtual antenna elements in Area 360 may be used to get better resolution and accuracy on the detected angles in the previous section (404). This results in grating lobes as well as high sidelobes here because of the sparsity of the array. However, it is assumed these sidelobes can be eliminated by using the previous results from beamforming in area 350. In one implementation, only better resolution and accuracy in the regions of interest found from beamforming in area 350 are desired. After finding the angle of arrival on the azimuth angle, the process moves to the next stage which is estimating the elevation angle of the detected objects. At first, pure beamforming using all the virtual antenna elements on Area 370 with and without windowing is performed (405). Using windowing sidelobes may be reduced by sacrificing resolution. The next step is to detect elevation angle belongs to which precalculated azimuth angle. To solve this ambiguity, for each detected azimuth angle, all the antenna elements (Area 380) to find the defined elevation angle may be used (407). In one implementation, using all the antenna elements will increase the sidelobes a lot; therefore, we need to focus on the detected elevation angle area. This process can be iterated several times between azimuth and elevation angles (408). In the iteration phase we can use different antenna array elements on each iteration to get different azimuth and elevation coupling factors.

The disclosed embodiments include:
  a. placing antenna elements in a non homogeneous way (dense in one side and sparse in the other side) to decrease sidelobes as well as greatly decrease grating lobes at the same time.
  b. placing two MIMO transmitter antennas at the edge of the available area and some others between them to reduce sidelobes of the antenna array.
  c. hybrid analog and digital beamforming inside the array configuration, using analog beamforming inside each molecule and MIMO sparse digital beamforming between molecules inside the cells, tissues and organ.
  d. sequential beamforming in azimuth angle in two steps to eliminate adverse effect of sidelobe and grating lobe and at the same time achieve very high resolution and accuracy
  e. a technique for eliminating ambiguity in elevation angle estimation
  f. an iterative method for eliminating angular coupling between azimuth and elevation angle.

The invention can be implemented in software, hardware or a combination of hardware and software. Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The various embodiments, implementations, features and aspects of the invention noted above can be combined in various ways or used separately. Those skilled in the art will understand from the description that the invention can be equally applied to or used in other different settings with respect to various combinations, embodiments, implementations or features provided in the description herein.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Using radar systems to detect targets moving through an area is well understood and has been utilized for years. However, with a large number of Tx MIMO, the doppler ambiguity will decrease, and for fast moving targets the doppler folding might happen. The doppler folding will result in wrong doppler value as well as distorted beamforming results and potentially grating lobes, which could result in a wrong/not accurate direction of arrival To solve this problem, discussed herein are various systems and methods that can estimate a Doppler of a target and then compensate for the effect of the target movement in a MIMO radar using the value for the estimated Doppler. The compensation value addresses Doppler ambiguity. Historically, Doppler ambiguity was reduced via the use of more and more MIMO antennas. However, logistical, and sensor size and cost make this solution prohibitive at a certain scale.

Accordingly, there is a high demand for improved radar systems that can increase the angular resolution of radars without dramatically increasing the cost. However, as noted herein, in order to obtain better angular resolution results, a large aperture size is required for the antenna arrays. As would be understood by one of ordinary skill in the art, the large aperture area would need to be filled with a large number of antenna elements. As previously stated, using more and more antenna elements results in various negative consequences, such as, for example, a huge computational burden, excessive power consumption, more complicated device design, and of course cost. One solution to this issue is to utilize a semi-sparse array of elements in the array. However, although using a semi-sparse array can reduce the design complexity and cost, it generally results in large sidelobes and/or grating lobes in the final antenna pattern.

Thus, disclosed herein are novel systems and methods that perform three-dimensional ("3D") beamforming in azimuth and elevation separately and then combining the results properly, which results in a fine resolution. More specifically, the systems and methods disclosed herein utilized the discussed techniques to mitigate the effect of the sidelobes and/or grating lobes in azimuth and elevation beamforming. In order to achieve this, a semi-sparse antenna array (i.e., an antenna array with fewer antenna elements than conventional design) is implemented in which the antenna elements create "virtual" antenna elements, discussed further herein.

The creation of these virtual antenna elements allows for a much larger antenna array size (i.e., higher resolution) using fewer physical elements. However, as should be expected, the virtual elements are not as robust and/or accurate as real antenna elements. Thus, one or more additional steps may be required to utilize the virtual elements in practice. Specifically, as discussed herein, an iterative sequential processing is performed, in which: (1) a high resolution (i.e., large) area is scanned using both the real and virtual elements, (2) ambiguities within the scan are identified, and (3) a more accurate (i.e., zoomed in) scan is performed to resolve the identified ambiguities.

For example, some embodiments may utilize a novel technique for 3D beamforming in a sequential manner. As discussed in more detail herein, by estimating an azimuth angle in multiple ordered steps and then estimating an elevation angle in a similar ordered manner, a high angular-resolution radar (i.e., one having a large number of elements) may be able to be mimicked or synthesized using a semi-spare array (i.e., a radar array requiring much fewer elements). More specifically, disclosed herein are systems and methods for estimating an angle in a semi-sparse MIMO array which is not sensitive to grating lobes and sidelobes.

Referring briefly to FIG. 1, an example embodiment is shown of a hybrid analog-digital semi-sparse-MIMO array configuration for azimuth angle estimation. As shown in FIG. 1, an array manifold for estimating azimuth may include multiple parts. For example, the array may have typical (the antenna element distance is half a wavelength for very close to half wavelength) element array 101, referred to herein as "a molecule." As discussed herein, each molecule may be composed of several "atoms" 111. An atom 111, as discussed in this disclosure, refers to a single antenna element (e.g., an RX or TX element), which could be a patch, dipole, slot, or any other type of known antenna. In some embodiments, several atoms 111 grouped together may form a molecule 101. In a further embodiment, the atoms 111 may utilize analog/digital beamforming.

Referring briefly to FIG. 2, in some embodiments, and as shown, multiple types of molecules can be used (e.g., 201 and 202). The number of atoms 211/212 in each molecule 201/202 can be different on the receiver and transmitter side. Returning again to FIG. 1, an example embodiment is shown that has a RX molecule 101 and a TX molecule 102. Each molecule have their own atoms 111/112 respectively. In a further embodiment, several molecules may be used together to create a cell 121/122. As will be discussed further herein, the placement of the atoms 111/112, molecules 101/102, and cells 121/122 may be critical to the function of the array.

In some embodiments, and as shown in FIG. 1, a large number of antenna elements (i.e., atoms) may be placed on one edge of the available area (i.e., as shown in FIG. 1, on the left side) and a minimal number on the other edge (i.e., as shown in FIG. 1, on the right side). Stated differently, as shown in FIG. 1, the cell(s) 121/122 represents a large number of elements closely grouped together, whereas the isolated molecules 101a/102a represent a small number of elements (i.e., atoms) remotely located from the cell(s). By way of non-limiting example, in one embodiment, ten (10) molecules may be placed on the left side of an array (i.e., the available area for azimuth digital beamforming elements), and only one (1) molecule is placed on the right side of the array.

Referring now to FIG. 3, which shows an example of a total radar array configuration 380. The configuration 380 includes areas 350, 360, and 370. The area 350 may contain one or more physical/virtual Rx antenna elements to capture an azimuth angle that would have no ambiguity. However, the small size of area 350 may result in low resolution data (i.e., the actual target is identified, but is blurry or inaccurate). Thus, in some embodiments, a secondary step is taken which may increase the resolution and accuracy for detected angles. Additionally, the system may use all the virtual antenna elements in area 360 to get better resolution and accuracy on the detected angles (i.e., the angle identified by area 350). The system may alter the steps of the process, such as, for example, the initial target tracking may be done using area 360, which may result in high-definition data, but may include multiple (i.e., 2, 3, 4, 5, etc.) targets. Thus, when area 360 is used first, area 360 may be used subsequently to remove all the false positives (i.e., ghost targets due to the grating lobes in the sparce antennas). In some embodiments, and as shown, area 370 may contain both real and virtual elements, thus a similar multi-step process may be used to capture high resolution data of the target.

As shown, the receiver molecules 352 may be placed uniformly to fill the area 350. Alternatively, the last receive antenna molecule 352n may be placed at the edge of the available area to extend the physical aperture size of the array in the azimuth direction as much as possible. It should be understood that the area available for the placement of antenna elements may be dependent on various factors, such as, for example, the size of the array, the other electronic elements located on the physical board, etc. In another embodiment, and as shown, all the elements (i.e., TX and RX elements) with MIMO techniques will result in area 360, which may allow the system to perform more accurate azimuth beamforming. The area 360, which may be referred to herein as a "tissue," enables many cells (e.g., FIG. 1 at 121 and 122) work together inside a tissue to perform azimuth beamforming.

In another implementation, an alternative approach and/or element layout may be used in the elevation domain. As would be understood by one of ordinary skill in the art, the main reason for this alternative is that the field of view ("FOV") and/or coverage angle in an elevation determination is completely different to that of an azimuth determination. By way of non-limiting example, most typical radars have an elevation FOV of +/−10 degrees compared to an azimuth FOV of +/−60 degrees. Accordingly, the molecules 372 in the elevation direction are placed in a semi-sparse, but more uniform pattern, such that each molecule could employ analog beamforming.

For MIMO on the transmitter side, one transmitter is needed at each edge to maximize resolution. In some embodiments, the transmitter antennas may be used to reduce sidelobes. By way of non-limiting example, two tissues (e.g., area 350 and 360) may be used together with the help of MIMO transmitters to enable the system to cover the area between them and thus the system can solve for any coupling issues that exist between the azimuth and the elevation angles.

Thus, as discussed herein, the system may utilize a horizontal antenna array (e.g., 350, 360, etc.) to determine an azimuth angle. The horizontal antenna array may include an initial plurality of receive antennas and one or more secondary receive antennas, where, as shown in FIG. 3, at least one of the one or more secondary receive antennas are horizontally separated from the initial plurality of receive antennas based on a known distance, and any additional secondary receive antennas are horizontally separated from the one or more secondary receive antennas based on the known distance.

Similarly, the system may utilize a vertical antenna array to determine an elevation angle. The vertical antenna array may include an initial plurality of receive antennas and one or more secondary receive antennas, where, as shown in FIG. 3, at least one of the one or more secondary receive antennas are vertically separated from the initial plurality of receive antennas based on a known distance, and any additional secondary receive antennas are vertically separated from the one or more secondary receive antennas based on the known distance.

The organ 380 may include any number of antenna elements. By way of non-limiting example, a typical number of physical antenna elements could be 128 receivers and 96 transmitters. More specifically, $N\_Analog\_Beam\_Elevation\_Rx=8$, $N\_Analog\_Beam\_Elevation\_Tx=8$, $N\_Azimuth\_RX\_1=10$, $N\_Azimuth\_RX\_2=2$, $N\_Elevation\_RX=4$, $N\_Azimuth\_TX=8$, $N\_Elevation\_TX=4$. In another non-limiting example, the typical virtual array size may be 16×12×8, or a total of 1536 elements. Thus, as described herein, some embodiments may have a method of hybrid beamforming, which uses analog beamforming inside a molecule and digital beamforming between molecules.

As discussed herein, in some embodiments, sequential beamforming is performed. For example, the system may first perform azimuth beamforming, then second perform elevation beamforming, and finally remove any ambiguity/mapping between detected Azimuth and elevation angles. Specifically, referring to FIG. 4, the system may estimate the doppler of the target (Step 401). To do so, the system may utilize all or a portion of the virtual antenna elements (FIG. 3 at 381).

In some embodiments, after non-coherent integration of Range Doppler heatmaps a target can be detected and the Doppler will be estimated (Step 401). However, in an alternative embodiment, the system may have some overlap between antenna elements, which can be used to perform coherent beamforming between antenna elements. After the doppler of the target is estimated (Step 401), and the effect of the target movement on the phase is compensation the system may perform azimuth beamforming using all, or a portion of, antenna elements (Step 402) in section 350 to find the estimated angle of the arrival (Step 403) only in azimuth without grating lobes.

In some embodiments, it may be desired to reduce any sidelobes, which may be accomplished using windowed beamforming. Next, in some embodiments, a fine azimuth beamforming may be performed on area 360 to increase the resolution and accuracy for any detected ambiguities (Step 404). In some embodiments, the system may utilize all the virtual antenna elements in area 360 in order to get better resolution and/or accuracy on the detected angles from the previous section (Step 404).

As discussed herein, because the system utilizes a semi-sparse arrangement of elements, it is likely that the estimated azimuth will have grating lobes as well as high sidelobes due to the sparsity antennas in the array. However, because of the sequential method of beamforming, the system can determine which, if any, of the ambiguities are incorrect. Thus, in some embodiments, the grating lobes and sidelobes can be identified and eliminated by relying on the previous, non-ambiguous results or windowed results (i.e., the angles detected from beamforming in area 350).

After finding the angle of arrival on the azimuth angle, the system may move on to the next stage, involving estimating the elevation angle of the detected objects. Thus, in some embodiments, the system may first perform pure beamforming using all the virtual antenna elements on area 370 with and without windowing (Step 405). By windowing the estimated angles, the system can reduce the identified sidelobes (i.e., ambiguities) by sacrificing resolution. However, the system then needs to determine which detected elevation angle ambiguities belong to which precalculated azimuth angle (Step 406).

Figure 4:
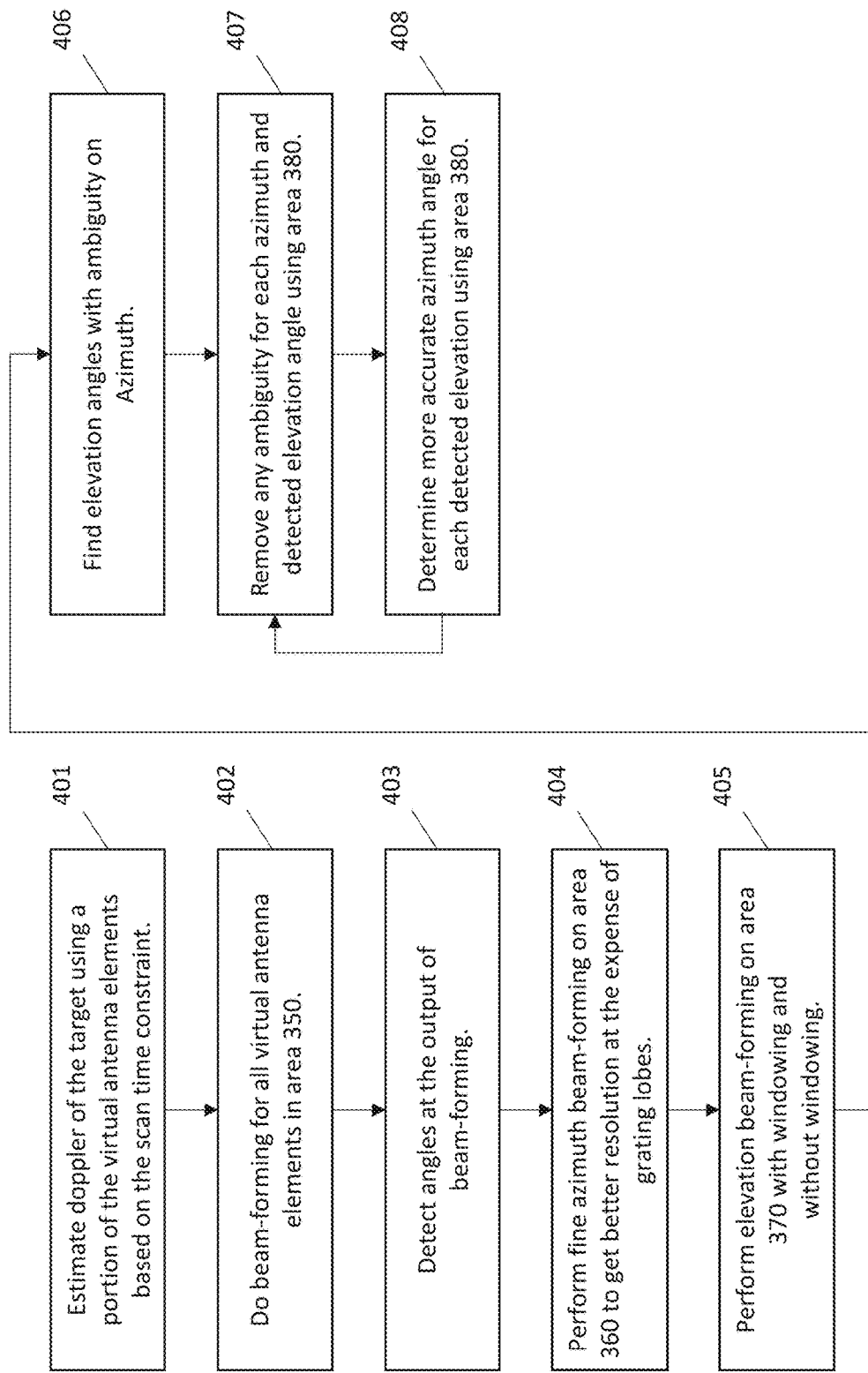
FIG. 4 is a conceptual technique for angular estimation based on an embodiment.

Thus, and as shown in FIG. 4, the system may, in an effort to solve for any identified ambiguities, use all the antenna elements (Area 380) to find the defined elevation angle for each detected azimuth angle (Step 407). The process of using all of the antenna elements (including the virtual elements) may cause an increase in the number of sidelobes. Thus, the system may need to focus on the detected elevation angle area. This process may be iterated several times between azimuth and elevation angles (Steps 407/408). Through an iterative process, the system may use different antenna array elements (e.g., on each iteration) to distinguish the correct azimuth and elevation combinations. Stated differently, using the entire array 380, including the virtual elements, results in grating-lobes/high-sidelobe-level. Those ambiguities can then be identified/resolved via the proposed sequential beamforming method and the iterative process of Steps 407 and 408, which allows the more accurate arrays, to focus on or "window" the ambiguities and thus eliminate them.

As discussed herein, and shown in FIG. 3, the system may include a horizontal antenna array 350/360 that has a plurality of horizontal elements 352-352n, which are configured to detect an azimuth angle estimation. The system may include a vertical antenna array 370 including a plurality of vertical elements 372 configured to detect an elevation angle estimation. Moreover, the plurality of vertical elements and/or the plurality of horizontal elements may be arranged in a semi-sparse and/or non-sparse distribution.

Referring to FIG. 5, an example technique for sequential beamforming in a semi-sparse MIMO array is shown. Thus, and as shown in FIG. 5, the system may determine a low-resolution azimuth angle with no ambiguities using a non-sparse horizontal antenna array (Step 501). Next, the system may determine a high-resolution azimuth angle with ambiguities using a semi-sparse horizontal antenna array including one or more virtual antennas (Step 502). Similar to the azimuth angle detection, in some embodiments, the system may determine a low-resolution elevation angle with no ambiguities using a non-sparse horizontal antenna array (Step 503), and then determine a high-resolution elevation angle with ambiguities using a semi-sparse horizontal antenna array including one or more virtual antennas (Step 504). As discussed herein, the system may, based on the at least one azimuth angle and the at least one elevation angle determinations, identify one or more ambiguities, and via the iterative process discussed in FIG. 4, resolve all existing ambiguities in the azimuth-elevation coupling, using a combination of semi-sparse, non-sparse, and virtual antennas in a 2D grid which help to remove the Azimuth-Elevation coupling (Step 505).

The detailed examples of systems, devices, and techniques described in connection with FIGS. 1-5 are presented herein for illustration of the disclosure and its benefits. Such examples of use should not be construed to be limitations on the logical process implementations of the disclosure, nor should variations from patterns or layouts of antenna elements from those described herein be considered outside the scope of the present disclosure.

In some examples, a hardware module may be implemented mechanically, electronically, or with any suitable combination thereof. For example, a hardware module, such as, for example, any component shown in FIGS. 1-3, may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

The invention claimed is:

1. A multiple-input and multiple-output (MIMO) radar system, comprising:
   a horizontal antenna array comprising a plurality of horizontal elements configured to detect an azimuth angle estimation, the plurality of horizontal elements being arranged in a horizontal distribution that includes a sparse horizontal antenna array and non-sparse horizontal antenna array;
   a vertical antenna array comprising a plurality of vertical elements configured to detect an elevation angle estimation, the plurality of vertical elements being arranged in a vertical distribution that includes a sparse vertical antenna array and non-sparse vertical antenna array;
   a two-dimensional antenna array comprising: a portion of the horizontal antenna array and a portion of the vertical antenna array;
   a processor; and
   a memory, coupled to the processor, configured to store executable instructions, wherein the instructions, when executed by the processor, cause the processor to perform a sequential beamforming operation of steps to:
      estimate, using the non-sparse horizontal antenna array, at least one estimated low-resolution azimuth angle with substantially no ambiguities;
      estimate, using the sparse horizontal antenna array, at least one estimated high-resolution azimuth angle with first ambiguities;
      estimate, using the non-sparse vertical antenna array, at least one estimated low-resolution elevation angle with substantially no ambiguities;
      estimate, using the sparse vertical antenna array, at least one estimated high-resolution elevation angle with second ambiguities; and
      resolve the first and second ambiguities in an azimuth-elevation coupling of the horizontal and vertical elements, using a combination of the sparse horizontal and vertical antenna arrays and the non-sparse horizontal and vertical antenna arrays in the two-dimensional antenna array, including resolving the first ambiguities in the at least one estimated high-resolution azimuth angle, obtained using the sparse horizontal antenna array, and resolving the second ambiguities in the at least one estimated high-resolution elevation angle, obtained using the sparse vertical antenna array, using the at least one estimated low-resolution azimuth angle with substantially no ambiguities, obtained using the non-sparse horizontal antenna array, and the at least one estimated low-resolution elevation angle with substantially no ambiguities, obtained using the sparse vertical antenna array.

2. The system of claim 1, wherein the horizontal antenna array is formed in a first predetermined area having a first horizontal edge, a second horizontal edge opposite to the first horizontal edge, a first vertical edge and a second vertical edge opposite to the first vertical edge, and wherein the non-sparse horizontal antenna array is located at the first horizontal edge of the predetermined area and the sparse horizontal antenna array is located at second horizontal edge of the predetermined area, spaced apart from the non-sparse horizontal antenna array.

3. The system of claim 2, wherein the vertical antenna array is formed in the predetermined area, and wherein the non-sparse vertical antenna array is located at the first vertical edge of the predetermined area and the sparse horizontal antenna array is located at the second vertical edge of the predetermined area, spaced apart from the non-sparse vertical antenna array.

4. The system of claim 1, wherein the two-dimensional antenna array further comprises at least one virtual antenna.

5. The system of claim 4, wherein the instructions that cause the processor to analyze, using a portion of the two-dimensional antenna array, the ambiguities to determine a more accurate azimuth angle and elevation angle further comprise instructions that cause the processor to analyze, using the two-dimensional array antenna, the ambiguities to determine a more accurate azimuth angle and elevation angle of each target.

6. A method of using a MIMO radar system which includes a two-dimensional antenna array comprising a portion of a horizontal antenna array and a portion of a vertical antenna array, wherein the horizontal antenna array comprises a plurality of horizontal elements configured to detect an azimuth angle estimation, the plurality of horizontal elements being arranged in a horizontal distribution that includes a sparse horizontal antenna array and non-sparse horizontal antenna array and the vertical antenna array comprising a plurality of vertical elements configured to detect an elevation angle estimation, the plurality of vertical elements being arranged in a vertical distribution that includes a sparse vertical antenna array and non-sparse vertical antenna array, the method comprising:
    estimating, using the non-sparse horizontal antenna array, at least one estimated low-resolution azimuth angle with substantially no ambiguities;
    estimating, using the sparse horizontal antenna array, at least one estimated high-resolution azimuth angle with first ambiguities;
    estimating, using the non-sparse vertical antenna array, at least one estimated low-resolution elevation angle with substantially no ambiguities;
    estimating, using the sparse vertical antenna array, at least one estimated high-resolution elevation angle with second ambiguities; and
    resolve the first and second ambiguities in an azimuth-elevation coupling of the horizontal and vertical elements, using a combination of the sparse horizontal and vertical antenna arrays and the non-sparse horizontal and vertical antenna arrays in the two-dimensional antenna array, including resolving the first ambiguities in the at least one estimated high-resolution azimuth angle, obtained using the sparse horizontal antenna array, and resolving the second ambiguities in the at least one estimated high-resolution elevation angle, obtained using the sparse vertical antenna array, using the at least one estimated low-resolution azimuth angle with substantially no ambiguities, obtained using the non-sparse horizontal antenna array, and the at least one estimated low-resolution elevation angle with substantially no ambiguities, obtained using the sparse vertical antenna array.

7. The method of claim 6, wherein the two-dimensional antenna array further comprises at least one virtual antenna.

8. The method of claim 7, wherein analyzing, using a portion of the two-dimensional antenna array, one or more ambiguities to determine a more accurate azimuth angle and elevation angle further comprises: analyzing, using the at least one virtual antenna, the one or more ambiguities to determine a more accurate azimuth angle and elevation angle.

9. A multiple-input and multiple-output (MIMO) radar system, comprising:
    a horizontal antenna array comprising a plurality of horizontal elements configured to detect an azimuth angle estimation, the plurality of horizontal elements being arranged in a horizontal distribution that includes a first horizontal antenna array and second horizontal antenna array, wherein the first horizontal antenna array is less sparse than the second horizontal antenna array;
    a vertical antenna array comprising a plurality of vertical elements configured to detect an elevation angle estimation, the plurality of vertical elements being arranged in a vertical distribution that includes a first vertical antenna array and second vertical antenna array, wherein the first vertical antenna array is more sparse than the second vertical antenna array;
    a two-dimensional antenna array comprising: a portion of the horizontal antenna array and a portion of the vertical antenna array, wherein a portion of the second horizontal antenna array overlaps a portion of the second vertical antenna array;
    a processor; and
    a memory, coupled to the processor, configured to store executable instructions, wherein the instructions, when executed by the processor, cause the processor to perform a sequential beamforming operation of steps to:
        estimate, using the second horizontal antenna array, at least one estimated low-resolution azimuth angle;
        estimate, using the first horizontal antenna array, at least one estimated high-resolution azimuth angle with more ambiguities than the at least one estimated low-resolution azimuth angle;
        estimate, using the second vertical antenna array, at least one estimated low-resolution elevation angle;
        estimate, using the first vertical antenna array, at least one estimated high-resolution elevation angle with more ambiguities than the at least one estimated low-resolution elevation angle; and
        resolve the ambiguities in both the at least one estimated high-resolution azimuth angle and the at least one estimated high-resolution elevation angle using the at least one estimated low-resolution azimuth angle and the at least one estimated low-resolution elevation angle, and using all of elements of the first and second horizontal antenna array and the first and second vertical antenna array to determine a defined elevation angle for each detected azimuth angle and a defined azimuth angle for each detected elevation angle.

10. The system of claim 9, wherein resolving the ambiguities in both the at least one estimated high-resolution azimuth angle and the at least one estimated high-resolution elevation angle is carried out as an iterative process between different detected azimuth and elevation angles.

11. The system of claim 10, wherein the iterative process between different detected azimuth and elevation angles is carried out using different combinations of the horizontal antenna array and the vertical antenna array for each iteration of the iterative process.

\* \* \* \* \*